No. 870,150. PATENTED NOV. 5, 1907.
J. L. WOODBRIDGE.
SYSTEM OF ELECTRICAL DISTRIBUTION.
APPLICATION FILED MAY 21, 1907.
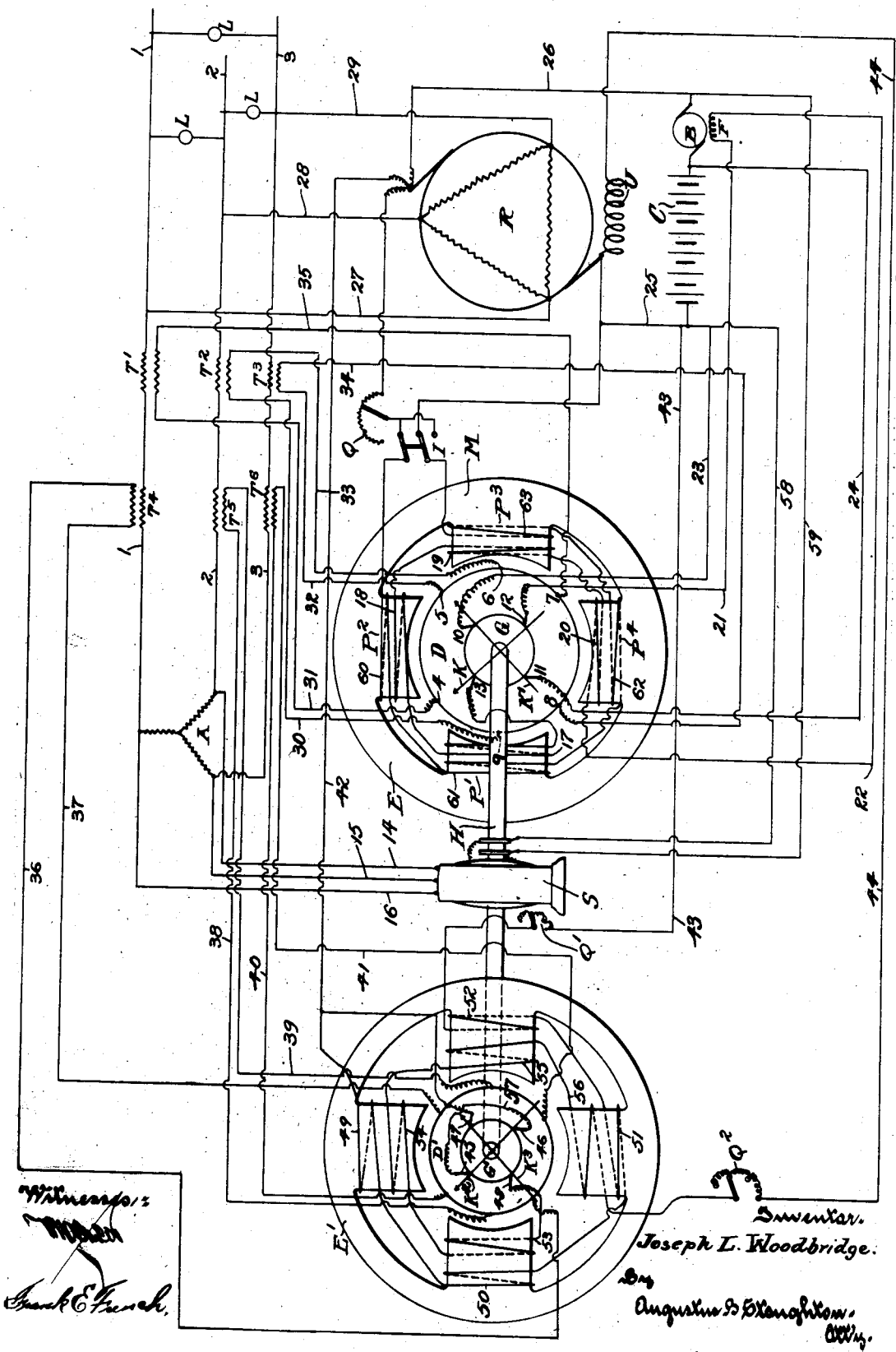

UNITED STATES PATENT OFFICE.

JOSEPH LESTER WOODBRIDGE, OF PHILADELPHIA, PENNSYLVANIA.

SYSTEM OF ELECTRICAL DISTRIBUTION.

No. 870,150.   Specification of Letters Patent.   Patented Nov. 5, 1907.

Application filed May 21, 1907. Serial No. 374,943.

*To all whom it may concern:*

Be it known that I, JOSEPH LESTER WOODBRIDGE, a citizen of the United States, and resident of Philadelphia, in the county of Philadelphia and State of Pennsylvania, have invented a certain new and useful System of Electrical Distribution, of which the following is a specification.

My invention relates to those systems of electrical distribution in which there is an alternating current and a direct current circuit with means for transferring energy in either direction between the two; and it is the object of my invention to provide more sensitive means for automatically effecting such transfer and for controlling the power factor on the alternating current circuit.

The general nature and scope of my invention will be more fully understood by reference to the following description in connection with the accompanying drawing in which is diagrammatically illustrated a system of distribution embodying features of my invention.

A, is a source of three phase alternating current feeding the consumption circuit 1, 2, 3, which supplies current to the translating devices L.

C, is a storage battery connected in series with its booster B, across the direct current terminals of the synchronous converter R, by means of the conductors 25 and 26. The converter R, is connected on the alternating current side by means of the conductors 27, 28 and 29, to the alternating current circuit 1, 2, and 3. The field F, of the booster B, is controlled by the exciter E, which will now be described.

The exciter E consists of a stationary field frame M, and a rotating armature D, which latter is directly connected by means of the shaft H, to the synchronous motor S. The motor S, is driven in synchronism with the electro-motive-force of the source A, by current supplied by conductors 14, 15 and 16. This motor, as shown, is of the revolving field type, its field current being taken from the terminals of the converter R, by means of the conductors 58 and 59. The armature D, is provided with a bi-polar winding, and is supplied with alternating current taken from the secondaries of the series transformers $T^1$, $T^2$, and $T^3$, whose primaries are connected in series with the alternating current circuit 1, 2, 3. The secondaries of these series transformers are connected by means of conductors 30, 31, 32, 33, 34, and 35, to six equidistant points 4, 5, 6, 7, 8, and 9, in the winding of the armature D, the ordinary diametric connection being used. It will be understood that these connections are made by means of the usual collector rings on the shaft, these rings having been omitted on the drawing for the sake of simplicity. The armature D, is also provided with a commutator G, connected to the armature winding in the usual manner. The field frame M, is provided with four pole pieces $P^1$, $P^2$, $P^3$ and $P^4$. The commutator G, is provided with two sets of brushes. One pair of these brushes 10 and 11, is connected by means of the conductors 23, and 24, directly across the terminals of the battery C. The other pair of brushes 12 and 13, is connected by means of the conductors 21 and 22 to the terminals of the field F, of the booster B. In this latter circuit is also connected in series the field winding 17, 18, 19, and 20, of the exciter E. A shunt field winding 60, 61, 62, and 63, is also shown on the poles of the exciter E, connected across the direct current terminals of the converter R. A switch I, is inserted in this field circuit, for reversing its polarity and a rheostat Q, for controlling its effect in the usual manner. The field coils 60, 61, 62, and 63, are wound in such direction as to produce a field excitation in the line of the arrow K. The operation of this apparatus is as follows:

The current supplied by the secondary windings of the series transformers $T^1$, $T^2$, and $T^3$, to the armature D would, if the armature were stationary, produce a rotating magnetic field. The armature, however, is driven by the motor S, in the opposite direction to the rotation of the field and at the same speed, the result being that a stationary field is produced by this alternating current. The adjustment is such that this field assumes the direction of the arrow K, so that the poles $P^3$ and $P^4$, are both of the same polarity, that is, north polarity, while the poles $P^1$ and $P^2$ are both of south polarity. The inductive effect of the field K, will be to produce a direct current voltage across the brushes 10 and 11, which are at right angles to the axis of the field. When the load on the alternating current circuit 1, 2, 3, due to the translating devices L, is exactly equal to the desired output from the source A, the adjustment is such that the voltage produced across the brushes 10 and 11, by the combined effect of the alternating current excitation and that of the field winding 60, 61, 62, and 63, shall be exactly equal to the voltage of the battery C, and no current will flow between these brushes and the battery. Under these conditions the potential across the brushes 12 and 13, will be zero and there will be no current in the booster field winding F. The adjustment between the battery C and the converter R, will then be such that the battery is neither charging nor discharging, and the converter R, is neither taking energy from, nor delivering energy to the alternating current circuit 1, 2, and 3. If now the load on the circuit 1, 2, 3, should increase, a small proportion of this increase getting back to the source A, through the transformers $T^1$, $T^2$, and $T^3$, will produce an increase in the current transmitted from the secondary windings of these transformers to the armature D, thus producing an increase in the field strength due to this exciting current and a corresponding increase in the potential between the brushes 10 and 11. Owing to the low resistance of the winding of the armature D and of the storage battery C, a comparatively small increase of potential across the brushes 10 and 11, will produce a considerable flow of current between these brushes and the battery. This current will produce an auxiliary magnetic field in the exciter E, in the direction of the arrow $K^1$, and this auxiliary field will in turn produce a difference of potential between the brushes 12 and 13, thus causing a flow of current from these brushes through the field winding of the exciter 17, 18 19 and 20, and the field winding F, of the booster B. This current in the booster field F, will excite the booster in the proper direction to cause the battery to discharge into the converter R, causing the latter to deliver energy to the circuit 1, 2, 3, and relieve the source A, of the greater portion of the increase of load. Conversely, if the load on the circuit 1, 2, 3, should decrease, the field strength K, produced by the alternating current in the armature D, will decrease, and the voltage across the brushes 10 and 11, will decrease correspondingly, causing current to flow from the battery into the armature D. This current will produce an auxiliary field in line with the arrow $K^1$ but in the opposite direction, thus producing a reversal of current in the booster field F and causing the battery to charge from the converter R, which in turn will take energy from the circuit 1, 2, 3, thereby maintaining the load on the source A. The effect of the current from the brushes 12 and 13, in the armature D, of the exciter will be to oppose the increase in field strength produced by the increase in alternating current from the transformers $T^1$, $T^2$ and $T^3$. The effect of this current from the brushes 12 and 13, in the field windings 17, 18, 19 and 20, will, however, be such as to assist the excitation produced by the alternating current. The number of turns of the winding 17, 18, 19 and 20, may be so adjusted that the effect of current in this winding from the brushes 12 and 13, will nearly counterbalance the effect of the same current in the armature winding. The advantage of the winding 17, 18, 19 and 20, is therefore to permit a much greater current to flow through the booster field F, with a given increase of load on the circuit 1, 2, 3, than would result if this winding were omitted. This winding, therefore, when properly adjusted will materially increase the sensitiveness of the exciter E, in causing the battery and booster to regulate the fluctuations of load on the circuit 1, 2, 3.
As shown in the diagram, the brushes 10 and 11, are connected directly across the terminals of the battery C. A certain advantage may be derived from this method of connecting these brushes owing to the fact that the battery voltage will drop when the battery discharges, and this drop in battery voltage will coöperate with the increase in excitation in the armature A, caused by an increase in load on the circuit 1, 2, 3, and will assist in producing a flow of current from the brushes 10 and 11, into the battery. It will be understood, however, that the brushes 10 and 11, may be connected across any approximately constant source of direct current electro-motive-force.

The effect of the application to the direct current terminals of the converter R, of the variable potential necessary to vary or reverse the transfer of energy between the alternating current circuit and the battery will produce a variation in the power factor of the converter and introduce wattless currents into the alternating current circuit which may be sufficient to cause undesirable results. In order to counteract this effect a second exciter $E^1$, is shown driven by the same synchronous motor S, the armature $D^1$, of this exciter being mounted upon the shaft H, of the synchronous motor. A second set of series transformers $T^4$, $T^5$ and $T^6$, is shown with their primary windings connected in series with the alternating current conductors 1, 2, and 3, and their secondaries connected by diametrical six phase connection to the armature $D^1$, by the conductors 36, 37, 38, 39, 40 and 41, in the same manner as was described in connection with the armature D, of the exciter E. The effect of the alternating current from the transformers $T^4$, $T^5$ and $T^6$, on the armature $D^1$, is such as would produce a magnetic field in the direction of the arrow $K^2$, this field being held stationary in position by the rotation of the armature. The excitation due to this alternating current in the armature is, however, neutralized by a shunt field winding 49, 50, 51 and 52, which is connected across the direct current terminals of the converter R, by means of the conductors 42 and 43. A rheostat $Q^1$, is introduced in series with this field winding to adjust its strength. A commutator $G^1$, is connected to the armature winding of $D^1$, and bearing on this commutator are two pair of brushes 45—46 and 47—48. The brushes 45 and 46, are electrically connected by a conductor 57 of low resistance; that is, they are short circuited. The other pair of brushes 47 and 48 is connected in series between conductor 42, which is connected to one of the direct current terminals of the converter R, and the shunt field winding U, of this converter, this shunt field winding being connected at its other terminal to the opposite direct current terminal of the converter.

Connected in series between the brush 48 of the exciter $E^1$, and the field winding U, of the converter is a series winding 53, 54, 55, and 56, on the fields of the exciter $E^1$, which serves to counteract the armature re-action in the armature $D^1$, due to the current flowing between the brushes 47 and 48. The operation of this exciter $E^1$, is then as follows:—So long as the alternating current in circuit 1, 2, 3, remains constant in amount and phase relation the adjustment is such that there is no field excitation in the exciter $E^1$, and no voltage across either pair of brushes. The current for the field U, of the converter R, flows from conductor 42, through the armature $D^1$, from brush 47 to brush 48 and thence around the series winding 53, 54, 55, and 56, this latter field winding counteracting the effect which would otherwise be produced on the field strength by the ampere turns of this current in the armature. If, however, the phase relation of the current in the circuit, 1, 2, 3, should change, a component at right angles to the original phase position of the current would be introduced which would produce a magnetic field in the exciter $E^1$, in the direction of the arrow $K^3$. This field will produce a voltage across the brushes 45 and 46 and because of the low resistance of the conductor 57, a very considerable current will flow between these brushes. This latter current will produce a considerable field strength in the direction of the arrow $K^2$, and this field will produce an electro-motive-force across the brushes 47 and 48. The adjustment should be such that when a lagging component of current is introduced into the circuit 1, 2, 3, the resulting electromotive-force across the brushes 47 and 48 will be such as to increase the current through the field winding U of the converter R. This increase in field strength of the converter R by introducing leading currents into the circuit 1, 2, 3, in the manner well known in the art, will counteract the effect of the lagging component, limiting this latter component to the very small amount necessary to produce the effect just described in the exciter $D^1$. Should a leading component be introduced into the circuit 1, 2, 3, the effect on the exciter $E^1$, will be just the reverse and the voltage developed across the brushes 47 and 48 will be such as to reduce the current in the field winding U and thus counteract such leading component. If the amount of current in the circuit 1, 2, 3, should increase without any change in the phase relation, the effect of this current would not be entirely neutralized by the shunt field winding 49, 50, 51 and 52, (assuming no change in the position of the rheostat $Q^1$), and the effect of this increase would be to establish a field in the direction of the arrow $K^2$, which would produce an electro-motive-force across the brushes 47 and 48. The effect of this electro-motive-force, would be to change the current in the field U of the converter R and introduce wattless components into the circuit 1, 2, 3. A very small wattless component, however, by producing a magnetic field in the direction of the arrow $K^3$, and a corresponding current through the conductor 57 would immediately counteract the effect of the increase in the amount of current in the circuit 1, 2, 3. The combination therefore of the two exciters E and $E^1$, driven by the synchronous motor S and excited by current from the alternating current circuit 1, 2, 3, in combination with the field windings above described constitutes an automatic control of the transfer of energy between the alternating circuit 1, 2, 3, and the battery C.

It will be understood that the exact value of the potential difference maintained across the brushes 10—11 in exciter E and across the brushes 45 and 46 in exciter $E^1$, is immaterial in as much as the shunt field windings on the two exciters may be designed with reference to any value of this potential difference that may be selected. In referring to a potential difference whose value may be arbitrarily selected, it will also be understood that zero is one of the values which such potential difference may assume, corresponding to a short circuit as shown in connection with exciter $E^1$.

What I claim is:

1. In combination an armature provided with winding and commutator, a magnetic field structure in inductive relation to the armature and adapted to complete the magnetic circuit for two sets of magnetic lines through the armature, each corresponding in number of poles with the armature winding but angularly displaced with respect to the other; two sets of brushes bearing on the commutator, a conducting circuit connecting the opposite brushes of one set and including a compensating winding on the field structure and an external regulating coil, a conducting circuit connecting the other pair of brushes, means for producing relative rotation of armature and field structure, and means for supplying exciting current to the armature winding.

2. In combination an armature provided with winding and commutator, a magnetic field structure in inductive relation to the armature and adapted to complete the magnetic circuit for two sets of magnetic lines through the armature, each corresponding in number of poles with the armature winding but angularly displaced with respect to the other; two sets of brushes bearing on the commutator, a conducting circuit connecting the opposite brushes of one set and including a compensating winding on the field structure, a conducting circuit connecting the other pair of brushes, means for producing relative rotation of armature and field structure; and means for supplying exciting current to the armature winding.

3. In combination, an alternating current circuit and its source, a dynamo electric machine comprising armature and magnetic field structure relatively rotatable; means for supplying to the armature alternating currents corresponding in phase relation and proportional to those in the circuit; means for producing relative rotation of armature and field in synchronism with the source; a commutator connected to the armature; two sets of brushes for the commutator, angularly displaced with respect to each other; means for maintaining a predetermined potential across the opposite brushes of one set; a regulating coil connected across the opposite brushes of the other set; and a winding on the magnetic field connected in series with the regulating coil and adapted to compensate for the armature reaction produced by the current from said brushes.

4. In combination, an alternating current circuit and its source, a dynamo electric machine comprising armature and magnetic field structure relatively rotatable; means for supplying to the armature alternating currents corresponding in phase relation and proportional to those in the circuit; means for producing relative rotation of armature and field in synchronism with the source; a commutator connected to the armature; two sets of brushes for the commutator angularly displaced with respect to each other, means for maintaining across the opposite brushes of one set a potential independent of the field excitation, a regulating coil connected across the opposite brushes of the other set; and a winding on the magnetic field connected in series with the regulating coil and adapted to compensate for the armature reaction produced by the current from said brushes.

5. In combination, an alternating current circuit and its source, a dynamo electric machine comprising armature and magnetic field structure relatively rotatable; means for supplying to the armature alternating currents corresponding in phase relation and proportional to those in the circuit; means for producing relative rotation of armature and field in synchronism with the source; a commutator connected to the armature; two sets of brushes for the commutator angularly displaced with respect to each other; means for maintaining a predetermined potential across the opposite brushes of one set; a regulating coil connected across the opposite brushes of the other set; and a winding on the magnetic field adapted to compensate for the armature reaction produced by the current from said brushes.

6. In combination, an alternating current circuit and its source, a dynamo electric machine comprising armature and magnetic field structure relatively rotatable, means for supplying to the armature alternating currents; corresponding in phase relation and proportional to those in the circuit; means for producing relative rotation of armature and field in synchronism with the source; a commutator connected to the armature; two sets of brushes for the commutator angularly displaced with respect to each other; means for maintaining across the opposite brushes of one set a potential independent of the field excitation; a regulating coil connected across the opposite brushes of the other set; and a winding on the magnetic field adapted to compensate for the armature reaction produced by the current from said brushes.

7. In combination an alternating current circuit and its source; a synchronous dynamo electric machine connected to the alternating current circuit and provided with a regulating coil adapted to control the transfer of wattless currents between the machine and the alternating current circuit; an exciter for the regulating coil comprising a magnetic field and an armature provided with a winding and commutator; means for transmitting through the armature winding alternating currents corresponding in phase and proportional to those in the alternating current circuit; two sets of brushes bearing upon the commutator and angularly displaced with respect to each other; means for maintaining a predetermined potential across one set of brushes; electrical connections from the second set to the regulating coil; a winding on the field of the exciter connected in series between the second set of brushes and the regulating coil and adapted to compensate for the armature reaction due to the current from said brushes; and means for producing relative rotation between the field and armature of the exciter in synchronism with the alternating current source.

8. In combination an alternating current circuit and its source, a synchronous dynamo-electric machine connected to the alternating current circuit and provided with a regulating coil adapted to control the transfer of wattless currents between the machine and the direct current circuit; an exciter for the regulating coil comprising a magnetic field and an armature provided with a winding and commutator; means for transmitting through the armature winding alternating currents corresponding in phase and proportional to those in the alternating current circuit; two sets of brushes bearing upon the commutator and angularly displaced with respect to each other; a conducting circuit of low resistance connected across one set of brushes; electrical connections from the second set to the regulating coil; a winding on the field of the exciter connected in series between the second set of brushes and the regulating coil and adapted to compensate for the armature reaction due to the current from said brushes; and means for producing relative rotation between the field and armature of the exciter in synchronism with the alternating current source.

9. In combination an alternating current circuit and its source; a synchronous dynamo-electric machine connected to the alternating current circuit and provided with a regulating coil adapted to control the transfer of wattless currents between the machine and the alternating current circuit; an exciter for the regulating coil comprising a magnetic field and an armature provided with a winding and commutator; means for transmitting through the armature winding alternating currents corresponding in phase and proportional to those in the alternating current circuit; two sets of brushes bearing upon the commutator and angularly displaced with respect to each other; means for maintaining a predetermined potential across one set of brushes; electrical connections from the second set to the regulating coil, and means for producing relative rotation between the field and armature of the exciter in synchronism with the alternating current source.

10. In combination an alternating current circuit and its source; a synchronous dynamo-electric machine connected to the alternating circuit and provided with a regulating coil adapted to control the transfer of wattless currents between the machine and the alternating current circuit; an exciter for the regulating coil comprising a magnetic field and an armature provided with a winding and commutator; means for transmitting through the armature winding alternating currents corresponding in phase and proportional to those in the alternating current circuit; two sets of brushes bearing upon the commutator and angularly displaced with respect to each other, a conducting circuit of low resistance connected across one set of brushes; electrical connections from the second set to the regulating coil; and means for producing relative rotation between the field and armature of the exciter in synchronism with the alternating current source.

11. In combination, an alternating current circuit and its source, a direct current source, transforming apparatus connected between the alternating current circuit and the direct current source and adapted to interchangeably transfer energy from one to the other; a regulating coil adapted to control said transfer of energy; an exciter for said regulating coil comprising a magnetic field and an armature provided with a winding and commutator; means for transmitting through the armature winding alternating current corresponding in phase and proportional to those in the alternating current circuit; two sets of brushes bearing upon the commutator, angularly displaced with respect to each other, means for maintaining a predetermined potential across one set; electrical connections between the second set and the regulating coil; a winding on the field of the exciter connected in series between the second set and the regulating coil and adapted to compensate for the armature reaction due to the current from the second set of brushes; and means for producing relative rotation between the field and armature of the exciter in synchronism with the alternating current source.

12. In combination, an alternating current circuit and its source, a direct current source, transforming apparatus connected between the alternating current circuit and the direct current source, and adapted to interchangeably transfer energy from one to the other; a regulating coil adapted to control said transfer of energy; an exciter for said regulating coil comprising a magnetic field and an armature provided with a winding and commutator; means for transmitting through the armature winding alternating currents corresponding in phase and proportional to those in the alternating current circuit; two sets of brushes bearing upon the commutator angularly displaced with respect to each other; means for maintaining a predetermined potential across one set; electrical connections between the second set and the regulating coil, and means for producing relative rotation between the field and armature of the exciter in synchronism with the alternating current source.

13. In combination an alternating current circuit and its source; a direct current source; transforming apparatus connected between the alternating current circuit and the direct current source and adapted to interchangeably transfer energy from one to the other; one regulating coil adapted to control said transfer of energy; a second regulating coil adapted to control the transfer of wattless currents between the transforming apparatus and the alternating current circuit; an exciter for each regulating coil each exciter comprising a magnetic field and an armature provided with a winding and commutator; means for transmitting through the armature winding of each exciter alternating currents corresponding in phase and proportional to those in the alternating current circuit; two sets of brushes for each exciter, bearing upon its commutator and angularly displaced with respect to each other; means for maintaining a predetermined potential across one set of brushes on each exciter, electrical connections from the second set of brushes on each exciter to the corresponding regulating coil of the transforming apparatus, a winding on the field of each exciter connected in series between the second set of brushes and the corresponding regulating coil of the transforming apparatus, and adapted to compensate for the armature reaction due to the current from said brushes; and means for producing relative rotation between the field and armature of each exciter in synchronism with the alternating source.

In testimony whereof I have hereunto signed my name.

JOSEPH LESTER WOODBRIDGE.

Witnesses:
FRANK E. FRENCH,
A. B. STOUGHTON.